July 3, 1928.
R. J. McCARTY, JR
AUXILIARY LOCOMOTIVE SUPPORT
Filed Aug. 16, 1926
1,675,456
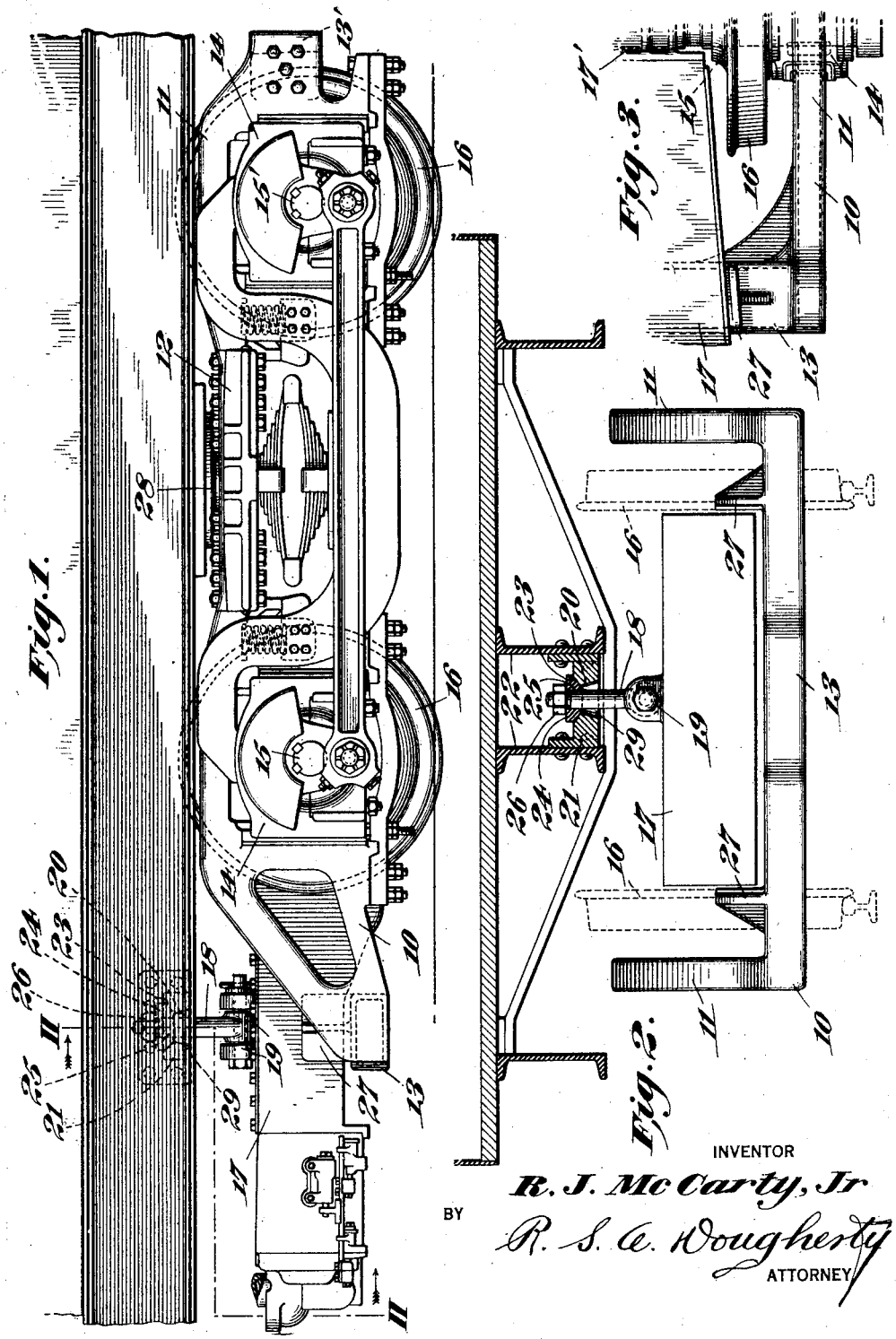
INVENTOR
R. J. McCarty, Jr
BY
R. S. C. Dougherty
ATTORNEY Patented July

UNITED

RICHARD J. McCARTY, JR., OF BETHLEHEM, PENNSYLVANIA, ASSIGNOR TO BETHLEHEM STEEL COMPANY.

AUXILIARY LOCOMOTIVE SUPPORT.

Application filed August 16, 1926. Serial No. 129,352.

My invention relates to railroad rolling stock and particularly to the mounting of an auxiliary motor thereupon.

It has been customary to support the motor between the axles of the truck or one end thereof on the axle to be driven and the other end on the frame of the truck. It is the object of my invention to relieve the truck frame from the weight of the motor and support such weight on the main frame of the vehicle body carried by the truck, so that the dead weight of the motor is efficiently distributed to the axles of the truck and the truck frame is relieved of the stresses which would otherwise be occasioned by the weight and the working forces of the motor.

A further object of my invention is to provide a support for an auxiliary motor which is independent of the truck frame so that the dead weight of the motor will be more or less uniformly distributed upon the truck axles.

The novel features of my invention will be more fully understood from the following description and claims taken with the drawings in which:

Fig. 1 is a side elevation of the truck of a railroad vehicle illustrating one embodiment of my invention;

Fig. 2 is a cross section taken on lines II—II in Fig. 1.

Fig. 3 is a partial plan view of the truck frame shown in Fig. 2.

Referring to the drawing: 10 indicates a truck frame comprising wheel pieces 11, transverse bolster member 12 and end cross ties 13 and 13'. The truck frame is provided with openings for receiving the bearings 14 of the spaced load bearing axles 15 and 15' which have secured thereto wheels 16.

The auxiliary motor frame 17 is provided at one end with suitable bearings 17' to fit the axle 15 and constitute a support for the motor. The other end of the motor frame is supported by a link 18 pivotally connected thereto, as at 19, the link extending upwardly and passing through an opening 20 formed in the bracket 21 fixed to the center sill 22 of the main frame of the vehicle body which is supported on the truck.

The upper side of the bracket 21 has a spherical recess 23 arranged preferably coaxially with the opening 20 to receive a bearing shoe 24 having a lower spherical face fitting the recess and an aperture 25 through which the link 18 passes. A nut 26 fits the upper threaded end of the link 18 above the shoe 24, so that the overhanging end of the motor frame is sustained from the center sill 22 by the link 18. The cross tie 13 extends beneath the motor frame 17 and is provided with upwardly extending brackets 27 which engage the respective sides of the frame 17 and limit the swinging of the latter horizontally with respect to the truck frame, but, however, did not limit relative vertical movement between the frames.

The truck frame 10 is articulate with respect to the center sill 22 and moves relatively thereto horizontally about the axis of the center bearing 28 when the vehicle rounds a curve.

The bracket 27 constrains the overhanging end of the motor frame to move horizontally with the truck frame and such movement is permitted by the pivotal connection 19 and the spherical supporting bearing comprised by the shoe 24 and the recess 23 in the bracket 21; as the motor frame moves angularly with respect to the center sill the link rocks on the spherical support aforementioned and said frame has free vertical movement with respect to the truck frame and allows such movement to take place. In order to provide clearance for the link to rock the opening 20 is flared downwardly, as at 29.

From the foregoing description it will be seen that I have devised means for supporting an auxiliary motor, which is adapted to propel a railroad vehicle, independently of the truck frame, so that the dead weight of the motor is relieved from the latter and is distributed uniformly at the load bearing axles to augment the tractive effort of the wheels.

While I have shown my invention in but one form, it will be obvious to those skilled in the art that it is not so limited, but is susceptible of various other changes and modifications without departing from the spirit thereof, and I desire, therefore, that only such limitations shall be placed thereupon as are imposed by the prior art or as are specifically set forth in the appended claims.

Having thus described my invention, what I claim as new and desire to secure by Letters Patent is:

1. In a railroad vehicle, a center sill, a truck having an axle, and a motor frame mounted on said axle and suspended from said center sill.

2. In a railroad vehicle, a center sill, a truck frame comprising wheel pieces interconnected by cross ties, a truck axle, spaced guide members extending from one of said cross ties, a motor frame mounted at one end on said axle and disposed interjacent said guide members, and a link supported by said center sill and connected to said motor frame.

3. In a railroad vehicle, a center sill, a truck frame, guide means, a wheel axle supporting said truck frame, and a motor frame mounted on said axle engaging said guide means and suspended from said center sill.

In testimony whereof I hereunto affix my signature.

RICHARD J. McCARTY, Jr.